Feb. 23, 1960 F. A. KROHM 2,925,616
CONNECTOR FOR WINDSHIELD WIPER ARM AND BLADE UNITS
Filed March 28, 1957
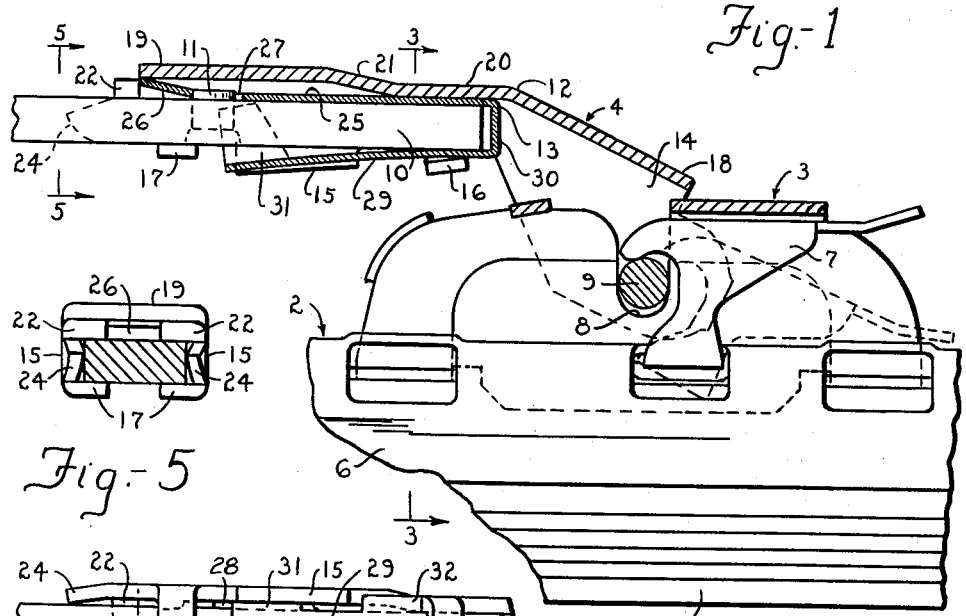
INVENTOR.
FRED A. KROHM
BY
Charles S. Penfold
ATTORNEY United States Patent Office 2,925,616
Patented Feb. 23, 1960

2,925,616

CONNECTOR FOR WINDSHIELD WIPER ARM AND BLADE UNITS

Fred A. Krohm, Hobart, Ind., assignor to The Anderson Company, a corporation of Indiana Application March 28, 1957, Serial No. 649,117

12 Claims. (Cl. 15—250)

This invention relates generally to windshield wiper devices and more particularly is directed to a connector for establishing a connection between a wiper arm unit and a fitting carried by a wiper blade unit.

The invention is primarily directed to improved means for securing a connector to a wiper arm unit. More specifically, the connector includes a housing or channel member provided with yieldable locking means having abutment means which interlock with abutment means on the wiper arm unit. The yieldable locking means is preferably in the form of a spring and an opening therein and a projection or lug on the arm constitute the aforesaid abutment means.

An important object of the invention is to provide a spring of generally U-shape to form a pair of legs which straddle the wiper arm and wherein one leg is provided with the opening above referred to for receiving the projection on the arm, and the other leg serves to substantially conceal that portion of the arm disposed in the spring.

Another object of the invention is to provide the channel member with spaced abutment means which respectively cooperate with the legs of the spring to hold the spring and member assembled after the spring is inserted into the member and contracted to place it under compression.

A further object of the invention is to provide a positive, durable and detachable connection between the connector and wiper arm and an arrangement whereby the connector is held against rockable movement with respect to the arm.

A specific object of the invention is to provide a connector in which the spring thereof is formed in a unique manner whereby the leg provided with the opening can be actuated by manipulating the other leg to effect release of the connector from the arm unit.

Other objects and advantages of the invention will become apparent after the description hereinafter set forth is considered in conjunction with the drawings annexed hereto.

In the drawings:

Figure 1 is an elevational view, showing the connector embodying the invention as applied to a wiper arm unit and a fitting carried by a wiper blade unit;

Figure 2 is an enlarged partial view of the assembly in Figure 1, with portions in section, to illustrate details of design and construction;

Figure 3 is a transverse sectional view taken substantially on line 3—3 of Figure 2;

Figure 4 is a perspective view of the connector with portions in section to exemplify structural details;

Figure 5 is a transverse sectional view taken substantially on line 5—5 of Figure 2;

Figure 6 is a bottom view of a portion of the connector and arm unit; and

Figure 7 is a partial elevational view of the connector applied to a pressure-distributing device and shows the manner of effecting the release of the connector from the arm unit.

Referring to the drawings, numeral 1 generally designates a wiper arm unit, 2 a wiper blade unit provided with a fitting 3, and a connector 4 embodying the invention.

The blade unit 2 includes a resilient wiping element 5 and a support 6 for the element. The fitting 3 comprises a housing provided with fingers which are preferably directly connected to the wiper element for resilient and rockable support thereon and a latch 7 having portions preferably disposed between the support 6 and the element for resilient and rockable support on the latter. The housing is also provided with a recess 8 which receives a cross-pin 9 on the connector 4 and the latch 7 serves to detachably secure the cross-pin in the recess as clearly depicted in Figure 2.

The wiper arm unit 1 has an inner shaft-engaging section for connection with a drive shaft and an outer pivotal assembly including a bar section having an end portion 10 for entering the connector. The end 10 is preferably rectangular in cross section and provided with a cylindrical projection 11 preferably pressed outwardly at right angles from the flat upper side of said end portion.

The connector 4 includes the cross-pin 9 above referred to, an elongate channel member or housing 12, and resilient means in the form of a generally U-shaped spring 13 preferably made from flat strip material. The channel has a large fore extremity having side walls 14 which carry the cross-pin 9 and straddle the fitting 3 on the blade unit and a smaller rear extremity having side walls 15 between which the spring is confined. It will be noted that the extremities are angled with respect to one another, with the fore extremity downturned from the arm unit so the blade unit may freely pivot without striking the arm unit. The side walls 15 of the channel are provided with a pair of inner corresponding inturned inclined fingers 16 constituting abutments engaged by the spring, and a pair of similar fingers 17 longitudinally spaced from the pair 16 and located adjacent the free end of the smaller extremity of the channel to assist in guiding or piloting the arm end 10 into the connector. The base wall of the channel includes a flat portion 18 joining the side walls 14 of the larger extremity, a pair of longitudinally spaced flat portions 19 and 20 joining the side walls 15, and an inclined portion 21 joining the flat portions 19 and 20. It will be noted that the flat portion 19 is disposed in a plane above the plane of the portion 20 and that its end edge portion is deformed to provide a pair of corresponding inset stops or abutment means 22 forming an entrance opening 23 to assist in piloting the projection 11 on the arm into the connector. The side walls 15 of the smaller extremity of the channel are preferably provided with continuations 24 extending outwardly beyond the stops 22. These continuations in combination with the fingers 17 and stops 22 serve to pilot or guide the arm end 10 into the connector. The stops 22 and the fingers 16, constituting abutment means, serve to hold the channel and spring against relative longitudinal displacement and the fingers 16 lock the spring in place against lateral displacement in a direction substantially transverse to the longitudinal axis of the channel.

The spring 13, which constitutes the yieldable locking means, may be designed and constructed in various ways, but as disclosed herein includes an upper straight yieldable leg 25 having an angled offset 26 bearing on the flat base wall portion 19 and against the stops 22 to locate the major portion of the leg 25 in a spaced movable relation to the flat and inclined portions 19 and 21 of the base wall of the channel. The leg 25 is provided with abutment means preferably in the form of a round opening 27 adjacent the junction between the offset 26 and remaining portion of the leg. The leg is preferably widened by providing it with a pair of corresponding lateral bearing portions 28, which, among other things, engage the side walls of the connector and assist in preventing side displacement of the leg 25 in the channel and thereby center the opening therein so that it will readily accommodate the projection 11 on the arm end 10. The offsetting of portions 19 and 21 serves to provide clearance for movement of the leg 25 and the projection 11 on the arm when the arm end is inserted into the spring.

The spring 13 also includes a manually operable leg portion 29 joined to the leg portion 25 by a bridge end portion 30. The leg portion 29 is preferably of a length somewhat less than the length of the leg 25 and provided with a pair of corresponding inturned parallel pressure-distributing projections 31 which are located the same predetermined distance from the bridge end 30 of the spring. The relationship of the projections 31 on the leg 29 and the lateral bearing portions 28 on the leg 25 are preferably such that the projections 31 normally engage the lateral portions. The leg 29 is also preferably widened to provide a pair of corresponding lateral portions 32 which constitute abutment means or stops for engaging the fingers 16 of the connector channel.

It should be noted that the spring is also reduced in width at various locations so as to facilitate assembly of the spring with the connector channel and afford a set-up whereby the yieldable holding portion of the leg 25 will act to positively lock the arm end to the connector and the manually operable leg 29 may be manipulated to actuate the leg 25 to release the arm end. It should be further noted that the over-all distance between the pressure-distributing projections 31 on the leg 29 are guided by the side walls 15 of the connector channel.

To assemble the spring with the channel, the spring is held at an angle and the free end of the leg 25 is inserted into the channel between the pairs of fingers 16 and 17 and then moved outwardly between the fingers 17 and the stops 22 a sufficient distance to permit the bridge end 30 of the spring to clear the fingers 16 in order that this end of the spring can be pressed into the channel, after which the spring is pushed inwardly under the fingers 16 until the projections 32 engage the fingers 16, whereupon the free offset end 26 of the leg 25, after having slid on the stops 22, will snap against the flat portion 19 and behind the stops as shown in Figures 2, 4 and 6 to prevent relative longitudinal displacement between the spring and channel. The fingers 16 lock the spring in the channel. It will be noted that the fingers 16 are preferably inclined to assist in piloting the spring thereunder. When the spring is properly located in the housing or channel it will be under compression. Although the angled end 26 of the leg 25 of the spring intimately bears against the flat portion 19 of the channel the stops 22 assist in preventing the marginal edge of the end of the arm part 10 from catching on the end 26 when the part 10 is inserted into the spring and/or housing.

The connector can be readily connected to the arm unit by merely inserting the arm end into the spring 13 so that the projection 11 on the arm will enter the entrance opening 23 for piloting purposes and then ride on the outer surface of the inclined offset 26 of the spring to cause the leg to yield and when the projection 11 registers with the opening 27 in the leg 25 the leg will snap into a position to lock the projection in the opening. The arm end 10 is thus snugly detachably locked in place and against vibration in the connector with the leg 29 of the spring covering a portion of the end of the arm.

Attention is directed to the fact that the fingers or abutments 16 are spaced a predetermined distance from the flat portion 20 of the base wall of the channel, that the fingers or abutments 17 and stops 22 are spaced apart a predetermined distance, and that the thickness and width of the arm end in relation to the aforesaid portion, fingers and the width of the channel are such that when the arm end is inserted into the spring and/or housing, the arm end is substantially held against rocking or tilting. The arrangement also serves to prevent misalignment of the components.

As exemplified in Figure 7 of the drawing, the cross-pin 9 of the connector is permanently pivotally secured to a member 33 of a pressure-distributing device adapted for attachment to a wiper blade.

Having thus described my invention, it is obvious that various modifications may be made in the same without departing from the spirit of the invention; and, therefore, I do not wish to be understood as limiting myself to the exact form, construction, arrangement, and combination of parts herein shown and described.

I claim:

1. A connector comprising a housing for receiving an end of a windshield wiper arm provided with an abutment, and resilient means carried by the housing having an upper elongate portion provided with an abutment for interlocking connection with the abutment on the arm after the arm is brought into engagement therewith, said resilient means also having a portion disposed under the elongate portion for engaging and actuating the elongate portion to effect a disconnection of the abutments.

2. An assembly comprising a wiper arm part provided with an abutment, a housing receiving the arm part, resilient means carried by the housing, said resilient means including an elongate portion being provided with an abutment cooperating with the abutment on the arm part for locking the housing to said part, said elongate portion also being provided with a pair of portions joined thereto and spaced inwardly from its ends at a location below the abutment thereon, said pair of portions being accessible for manual operation to cause retraction of the elongate portion for effecting disengagement of the abutments to permit separation of the arm part from the housing.

3. A connector comprising a housing for receiving an end of a windshield wiper arm part provided with a projection, a spring carried by the housing, said spring having an elongate yieldable portion provided with an opening for receiving the projection after the arm part is inserted into the housing, said elongate portion also being provided with a pair of portions joined thereto and spaced inwardly from its ends at a location below the opening therein, said pair of portions being accessible for manual operation to cause retraction of the elongate portion for effecting release of the projection from the opening.

4. A connector comprising a housing, and a spring carried by the housing having an elongate upper yieldable portion provided with abutment means for connection with a projection on a windshield wiper arm for holding the connector assembled with the arm part after the part is brought into engagement therewith, said spring also having a pair of portions located under the elongate portion for engaging and actuating the elongate portion for effecting the release of such a projection from the abutment means.

5. An assembly comprising a windshield wiper arm part, a housing receiving said part, a spring having a movable part carried by the housing, one of said parts being provided with an opening and the other part being provided with a projection disposed in the opening for locking the housing to the arm part, and means carried by the spring underlying its movable part for engaging and retracting the movable part thereof for releasing the projection from the opening.

6. A connector for a windshield wiper comprising a housing provided with a pair of longitudinally spaced abutment means, and an elongate spring disposed in the housing and having a movable part for detachably holding an entering part in the connector, said spring having a portion adjacent each extremity cooperable with the abutment means for limiting relative longitudinal displacement between the housing and spring, one of said abutment means also serving to hold the spring to the housing, said spring also having a portion underlying the movable part for actuating the movable part.

7. A connector of the kind described comprising a housing provided with a pair of longitudinally spaced abutment means, and an elongate spring seated in the housing and formed with a pair of legs between which a windshield wiper arm part is adapted to be disposed for engagement with the legs, said abutment means cooperating with the legs of said spring for holding the spring in the housing, one of said legs being movable and provided with means for connection with a locking element on the arm part, the other of the legs being provided with means for straddling and actuating the movable leg.

8. A connector for a windshield wiper comprising a housing provided with a pair of longitudinally spaced abutments, an elongate spring disposed in the housing and having portions engaging the abutments to hold the spring in the housing and also having portions for straddling an entering part adapted for insertion into the housing, one of said straddling portions being provided with means for lockingly engaging means on the entering part, and means for engaging and retracting said one straddling portion for releasing the means thereon from the engaging means on the entering part.

9. A connector for a windshield wiper comprising a housing having a base wall and side walls, said side walls being spaced apart a predetermined distance, abutment means provided adjacent the base wall and abutment means carried by the side walls and spaced a predetermined distance from the abutment means adjacent the base wall, resilient locking means carried by the housing, an entering part disposed in the housing, means on the entering part and means on the resilient locking means interlocking with one another to lock the entering part in the housing, and means for effecting a release of the locking means from the entering part having a portion disposed under the locking means for engaging and retracting the locking means to effect release of the entering part, the width and thickness of the entering part being respectively slightly less than the space between the side walls and the space between the abutment means so as to substantially prevent a rocking or tilting movement between the entering part and connector.

10. A connector comprising a housing formed to receive an entering part on a windshield wiper arm unit in a manner whereby the part and housing are held against relative movement in all directions after the two are connected, and resilient means having a first portion provided with an abutment for engaging the entering part to hold the housing connected to the part, said resilient means including a second portion disposed in opposed relation to the first portion for actuating the latter to effect release of the entering part from the abutment.

11. In a connector of the class described, pivotal means for attachment to a windshield wiper blade assembly, a longitudinally disposed channel having an entrance opening, said channel carrying means for receiving in closely embracing relationship all opposing surfaces of the end portion of a windshield wiper arm when said end portion is inserted into the entrance opening of said channel, resiliently reactive abutment means carried by said connector and so disposed as to be displaced by a projecting member carried by said end portion of said windshield wiper arm while said end portion is in process of being inserted in the connector, said abutment means being disposed to move into position to prevent accidental removal of said connector from said arm after said arm has reached a predetermined locking position in the connector, and means disposed adjacent the entrance opening of the channel for actuating the resiliently reactive abutment means for effecting its release from the end portion of the arm.

12. A spring for use with a connector for establishing a detachable connection between a windshield wiper arm part provided with an abutment and a wiper blade unit, said spring comprising an elongate strip formed to provide a pair of legs for straddling and engaging opposed surfaces of the arm part, one of said legs being provided with an abutment for detachable engagement with the abutment on the arm part, and the other of said legs being provided with integral means for applying pressure to the said one leg in a manner whereby the abutment therein can be released from the arm abutment.

References Cited in the file of this patent

UNITED STATES PATENTS

| | | |
|---|---|---|
| 1,994,738 | Ritz-Woller | Mar. 19, 1935 |
| 2,709,825 | Nesson | June 7, 1955 |
| 2,751,620 | Ehrlich | June 26, 1956 |
| 2,807,822 | Scinta | Oct. 1, 1957 |